(12) United States Patent
Tarling

(10) Patent No.: US 7,891,634 B1
(45) Date of Patent: Feb. 22, 2011

(54) ADJUSTABLE SUPPORT RAILS FOR JET SKI AND MOTORCYCLE TRAILERS AND ASSOCIATED METHOD

(76) Inventor: Christopher Tarling, 9346 Carlton Oak Dr., #47, Santee, CA (US) 92071

( * ) Notice: Subject to any disclaimer, the term of this patent is extended or adjusted under 35 U.S.C. 154(b) by 545 days.

(21) Appl. No.: 11/974,437

(22) Filed: Oct. 12, 2007

Related U.S. Application Data

(60) Provisional application No. 60/850,825, filed on Oct. 12, 2006.

(51) Int. Cl.
| | |
|---|---|
| F16M 13/00 | (2006.01) |
| F16M 11/00 | (2006.01) |
| A47B 91/00 | (2006.01) |
| A47B 95/00 | (2006.01) |
| B65D 19/00 | (2006.01) |
| A47F 5/00 | (2006.01) |
| A47F 7/00 | (2006.01) |
| B60P 3/10 | (2006.01) |
| B62D 63/00 | (2006.01) |
| B62D 21/14 | (2006.01) |
| B62D 33/08 | (2006.01) |
| B62D 61/12 | (2006.01) |
| A47G 29/00 | (2006.01) |

(52) U.S. Cl. ............... 248/647; 248/346.01; 248/349.1; 248/125.9; 248/671; 280/414.1; 280/43.11; 280/47.131

(58) Field of Classification Search .................. 248/647, 248/671, 346.01, 346.03, 349.1, 370, 125.9; 280/414.1, 43.11, 248, 47.131
See application file for complete search history.

(56) References Cited

U.S. PATENT DOCUMENTS

| 3,131,902 | A | * | 5/1964 | Zak, Jr. .................... 248/354.3 |
| 3,379,314 | A | * | 4/1968 | Canning .................... 211/59.4 |
| 3,993,324 | A | * | 11/1976 | Carrick .................... 280/414.1 |
| 4,664,401 | A | * | 5/1987 | Carrick .................... 280/414.1 |
| 4,756,642 | A | * | 7/1988 | Quinn et al. .................... 405/7 |
| 5,431,423 | A | * | 7/1995 | Moreland, Sr. ............. 280/400 |
| 5,884,885 | A | * | 3/1999 | Schmidt, Jr. ........... 248/346.01 |
| RE36,567 | E | * | 2/2000 | Godbersen ............... 280/414.1 |
| 6,247,719 | B1 | * | 6/2001 | Youmans et al. ......... 280/414.1 |
| 6,250,662 | B1 | * | 6/2001 | Poppell ................... 280/414.3 |
| 6,830,410 | B2 | * | 12/2004 | Davidson et al. ............... 405/3 |
| 7,413,209 | B2 | * | 8/2008 | MacKarvich ........... 280/414.1 |
| 7,413,379 | B2 | * | 8/2008 | Creel et al. ..................... 405/7 |
| 7,581,745 | B2 | * | 9/2009 | Remedios et al. ........ 280/414.1 |
| 2009/0302572 | A1 | * | 12/2009 | Bryant, II ................ 280/414.1 |

* cited by examiner

*Primary Examiner*—Terrell McKinnon
*Assistant Examiner*—Christopher Garft

(57) ABSTRACT

A trailer rail assembly includes a base plank with a planar top surface raised above a horizontal plane and extending along an entire longitudinal length of the base member. Such a base plank has a U-shaped cross-section. The assembly further includes a cylindrical shaft with an annular cross-section spanning along an entire longitudinal length of the top surface. A support plate is statically and fixedly attached to the shaft and spanning along the entire longitudinal length of the base plank, and a mechanism for simultaneously rotating the shaft and the support plate in sync and about a fulcrum axis extends along an entire longitudinal length of the shaft while the base plank remains statically affixed at a stationary position.

12 Claims, 6 Drawing Sheets

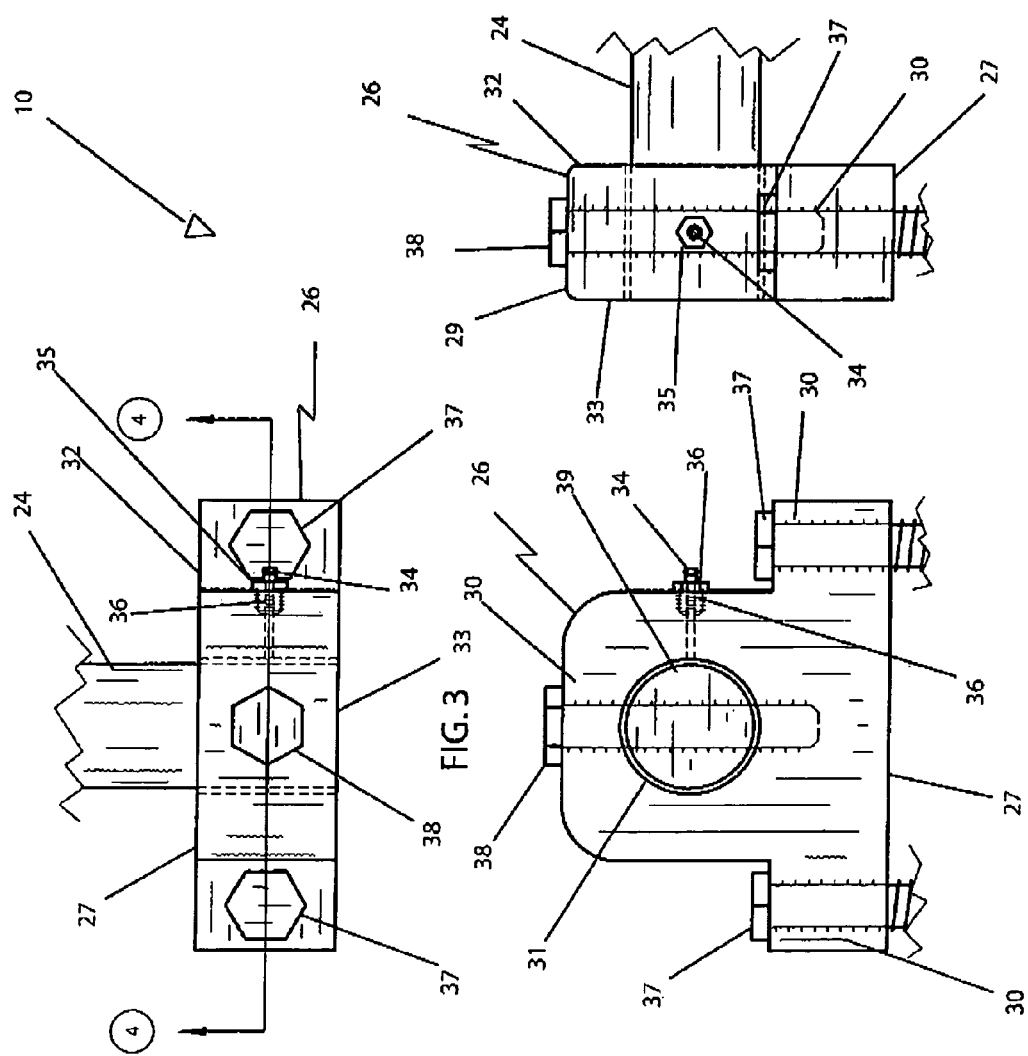

ADJUSTABLE SUPPORT RAILS FOR JET SKI AND MOTORCYCLE TRAILERS AND ASSOCIATED METHOD

CROSS REFERENCE TO RELATED APPLICATIONS

This application claims the benefit of U.S. Provisional Application No. 60/850,825, filed Oct. 12, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to trailers and, more particularly, to an adjustable trailer rail assembly for supporting objects on a vehicle trailer.

2. Prior Art

Americans have a long history for enjoying various types of outdoor activities and our proclivity for activities has not diminished, as attested to by the fact that about 90 percent of all Americans participated in some form of outdoor recreation in 2004. Decade by decade, the expanding population has achieved more leisure time, more money to spend, and better travel facilities, and it has sought more and better opportunities to enjoy the outdoors. Driving and walking for pleasure, swimming and picnicking lead the list of the outdoor activities in which Americans participate but millions of individuals also enjoy water related activities and riding motorcycles and ATVs for fun and enjoyment.

These types of activities frequently entail towing a boat, jet-ski, motorcycle or ATV to enjoy the vehicles away from home or while on vacation. Towing these types of vehicles also allows the owners to retain the use of the car or truck that was used as a towing vehicle while away from home. Many times, individuals would like to have the capability of towing two different types of vehicles, such as a jet-ski and motorcycle, but this is not feasible with existing hitch and trailer tow bar assemblies. Obviously it would be advantageous to provide a means of easily and conveniently towing two vehicles at the same time.

U.S. Pat. No. 5,531,560 to Bartholomew discloses a invention relates to a trailer 10 for towing vehicles having a single front wheel, such as a motorcycle, behind another vehicle. The trailer 10 includes a heavy duty frame 12 having concave shaped wheel carriages which engage the front wheel tire 26 of the vehicle to be towed. The configuration of the trailer 10 permits loading of the vehicle's front tire 26 by rotating the trailer 10 about the trailer wheels axis and rolling the vehicle's front tire into the concave wheel carriage 20. The tire 26 is then secured to the carriage 20 and the trailer 10 is rotated to engage the towing vehicle 32. This rotation lifts the vehicle front tire over and in front of the trailer wheels axle axis thereby suspending the front wheel of the vehicle or vehicles being towed off the ground, while the towed vehicle(s) rear tire remains on the ground.

U.S. Pat. No. 5,145,308 to Vaughn discloses a motorcycle towing apparatus is provided for use with a towing vehicle having a support bar which slidably engages a hitch receiver carried by the towing vehicle and having a ramp pivotally connected to the rear end of the support bar wherein the ramp is movable from a first position in which the ramp extends downwardly to the ground to a second position in which the ramp is elevated off the ground to provide clearance for towing, and also having a wheel cradle carried by the support bar to support the front wheel of the motorcycle. A single person can load and unload a motorcycle from the device.

U.S. Pat. No. 4,944,648 to Parr discloses a trailer assembly comprises spaced wheels connected by an axle, an elongate tow bar assembly projecting forwardly from the axle, and a load carrying frame pivotally mounted on the axle for movement between an upright, ground position for loading and unloading, a first towing position in which the frame is inclined forwardly, and a second towing position in which the frame is horizontal. First and second latching mechanisms are provided for releasably latching the frame in the first and second towing positions, respectively. Unfortunately, this prior art example does not provide a method for towing two recreational vehicles at once.

Accordingly, the present invention is disclosed in order to overcome the above noted shortcomings. The present invention satisfies such a need by providing an assembly that is convenient and easy, lightweight yet durable in design, and designed for supporting objects on a vehicle trailer. The trailer rail assembly is simple to use, inexpensive, and designed for many years of repeated use.

BRIEF SUMMARY OF THE INVENTION

In view of the foregoing background, it is therefore an object of the present invention to provide an apparatus for supporting objects on a vehicle trailer. These and other objects, features, and advantages of the invention are provided by a trailer rail assembly.

A trailer rail assembly includes a base plank with a planar top surface raised above a horizontal plane and extending along an entire longitudinal length of the base member. Such a base plank effectively has a U-shaped cross-section. The assembly further includes a cylindrical shaft with an annular cross-section spanning along an entire longitudinal length of the top surface. Such a shaft has a rectilinear shape and is directly coupled to the base plank and the support plate respectively.

The assembly further includes a support plate statically and fixedly attached to the shaft and spanning along the entire longitudinal length of the base plank. Such a support plate conveniently has planar anterior and posterior faces. The shaft is intercalated between the base plank and the support plate respectively, and the support plate is pivotal along an arcuate path defined above the base plank such that the support plate is offset at a 45 degree angle with respect to the horizontal plane.

The assembly further includes a mechanism for simultaneously rotating the shaft and the support plate in sync and about a fulcrum axis extending along an entire longitudinal length of the shaft while the base plank remains statically affixed at a stationary position. Such a simultaneous rotating mechanism includes at least one bracket statically mounted to a portion of the vehicle trailer adjoining an end of the base plank. Such a bracket has a raised central portion monolithically formed with a pair of oppositely seated lowered flange portions, and the central portion has an orifice advantageously formed therein and passing from an anterior surface to a posterior surface of the bracket at a height above the flange portions.

The simultaneous rotating mechanism further includes a zerk fitting traversing through a side of the central portion and extending along an entire inner perimeter of the orifice. A grease lubricant is effectively inserted into the zerk fitting, and a fastener is connected to an entrance port of the zerk fitting such that the zerk fitting is maintained at a stable and static position. An end of the shaft is rotatably interfitted within the orifice and arranged in such a manner that an outer circumference of the end of the shaft directly rubs against the zerk fitting and the lubricant to minimize a frictional force during operating conditions.

The simultaneous rotating mechanism further includes a plurality of auxiliary fastening members penetrated through the flange portions and into the vehicle trailer respectively. A primary fastening member is downwardly penetrated from a top surface of the central portion thru the orifice such that the primary fastening member conveniently locks the shaft at a static position while seated within the orifice. The shaft is freely rotatable within the orifice when the primary fastening member is removed from the orifice and detached from the shaft respectively.

A method for supporting objects on a vehicle trailer includes the steps of: providing a base plank with a planar top surface raised above a horizontal plane and extending along an entire longitudinal length of the base member; providing a cylindrical shaft with an annular cross-section by spanning the shaft along an entire longitudinal length of the top surface; statically and fixedly attaching a support plate to the shaft by spanning the support plate along the entire longitudinal length of the base plank; positioning the object against the support plate; and simultaneously rotating the shaft and the support plate in sync and about a fulcrum axis extending along an entire longitudinal length of the shaft while the base plank remains statically affixed at a stationary position.

The method further includes the steps of: statically mounting at least one bracket to a portion of the vehicle trailer adjoining an end of the base plank. Such a bracket has a raised central portion monolithically formed with a pair of oppositely seated lowered flange portions, and the central portion has an orifice formed therein and passing from an anterior surface to a posterior surface of the bracket at a height above the flange portions. The steps further include: traversing a zerk fitting through a side of the central portion by extending the zerk fitting along an entire inner perimeter of the orifice; inserting a grease lubricant into the zerk fitting; connecting a fastener to an entrance port of the zerk fitting such that the zerk fitting is maintained at a stable and static position; and rotatably interfitting an end of the shaft within the orifice by directly rubbing an outer circumference of the end of the shaft against the zerk fitting and the lubricant to minimize a frictional force during operating conditions.

The method further includes the steps of: penetrating a plurality of auxiliary fastening members through the flange portions and into the vehicle trailer respectively; downwardly penetrating a primary fastening member from a top surface of the central portion thru the orifice; the primary fastening member locking the shaft at a static position while seated within the orifice; and freely rotating the shaft within the orifice when the primary fastening member is removed from the orifice and detached from the shaft respectively.

The method further includes the steps of: directly coupling the shaft to the base plank and the support plate respectively; intercalating the shaft between the base plank and the support plate respectively; and pivoting the support plate along an arcuate path defined above the base plank such that the support plate is offset at a 45 degree angle with respect to the horizontal plane.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of a simultaneous rotating mechanism, in accordance with the present invention;

FIG. 2 is a side elevational view of a simultaneous rotating mechanism, in accordance with the present invention;

FIG. 3 is a top planar view of a simultaneous rotating mechanism, in accordance with the present invention;

FIG. 9 is a top planar view of the support plate, in accordance with the present invention.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 4:
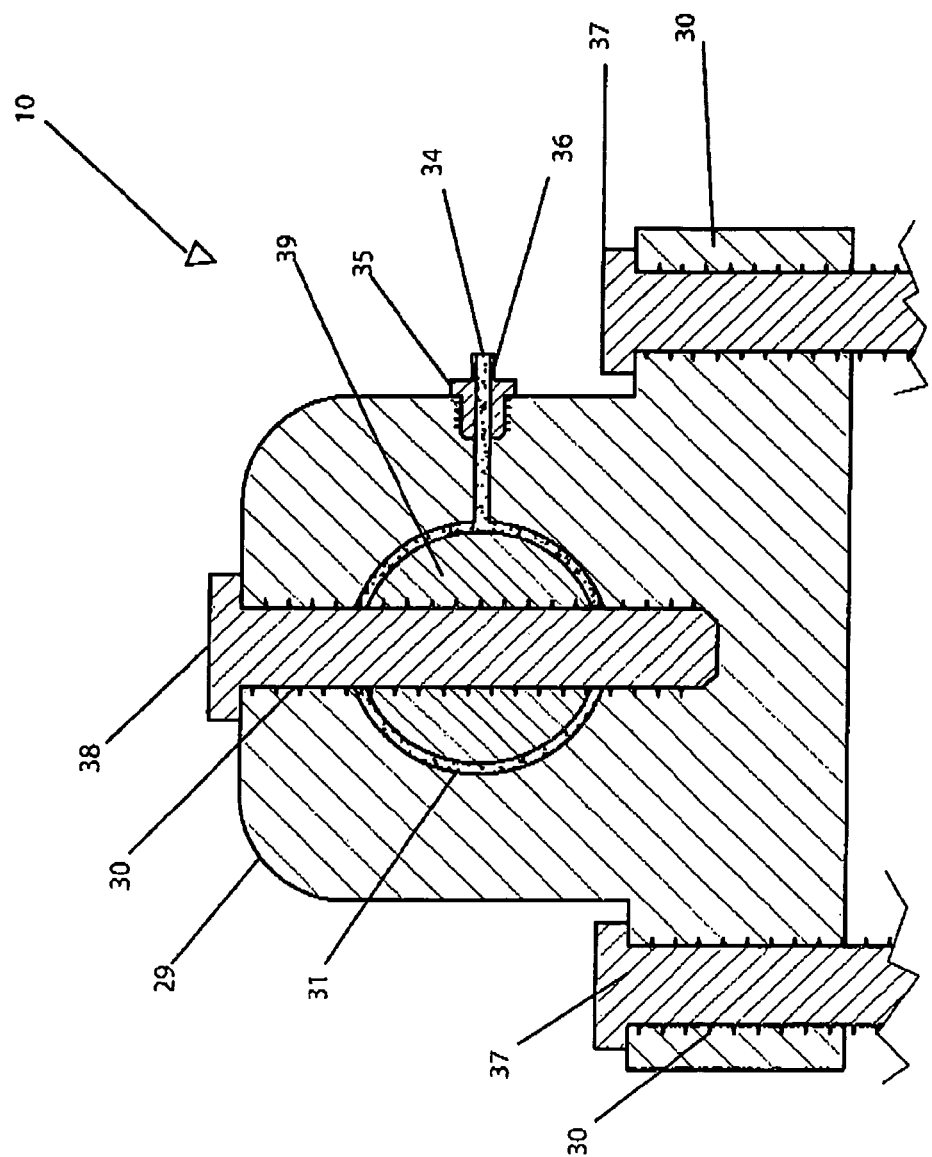
FIG. 4 is a cross sectional view of a simultaneous rotating mechanism, in accordance with the present invention.
Figure 5:
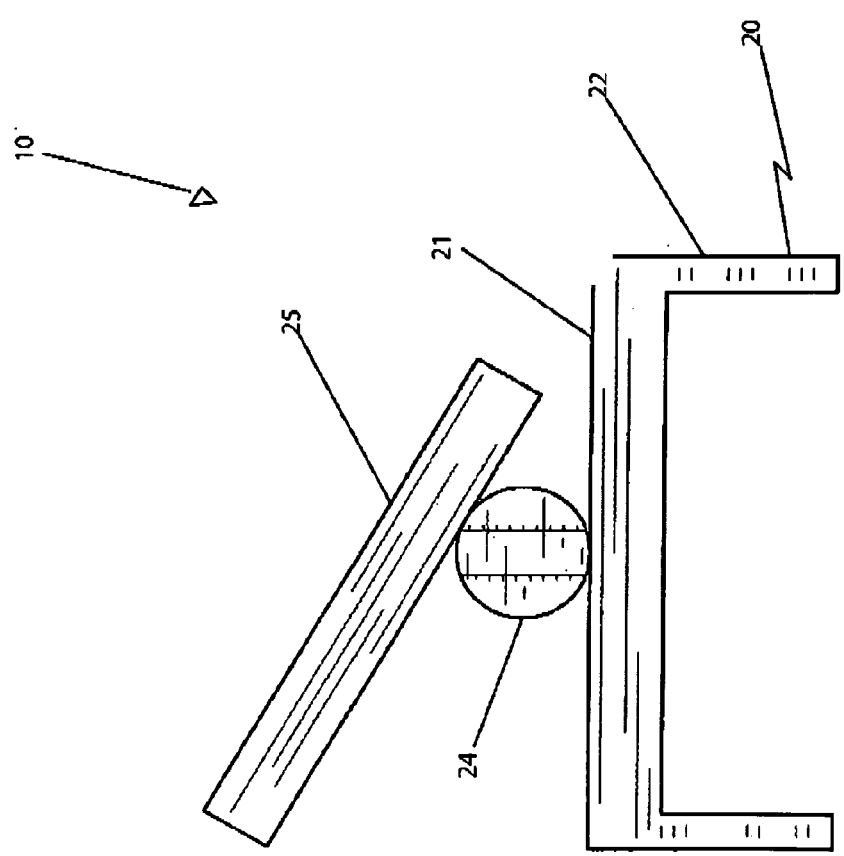
FIG. 5 is a front elevational view of a trailer rail assembly, in accordance with the present invention.
Figure 6:
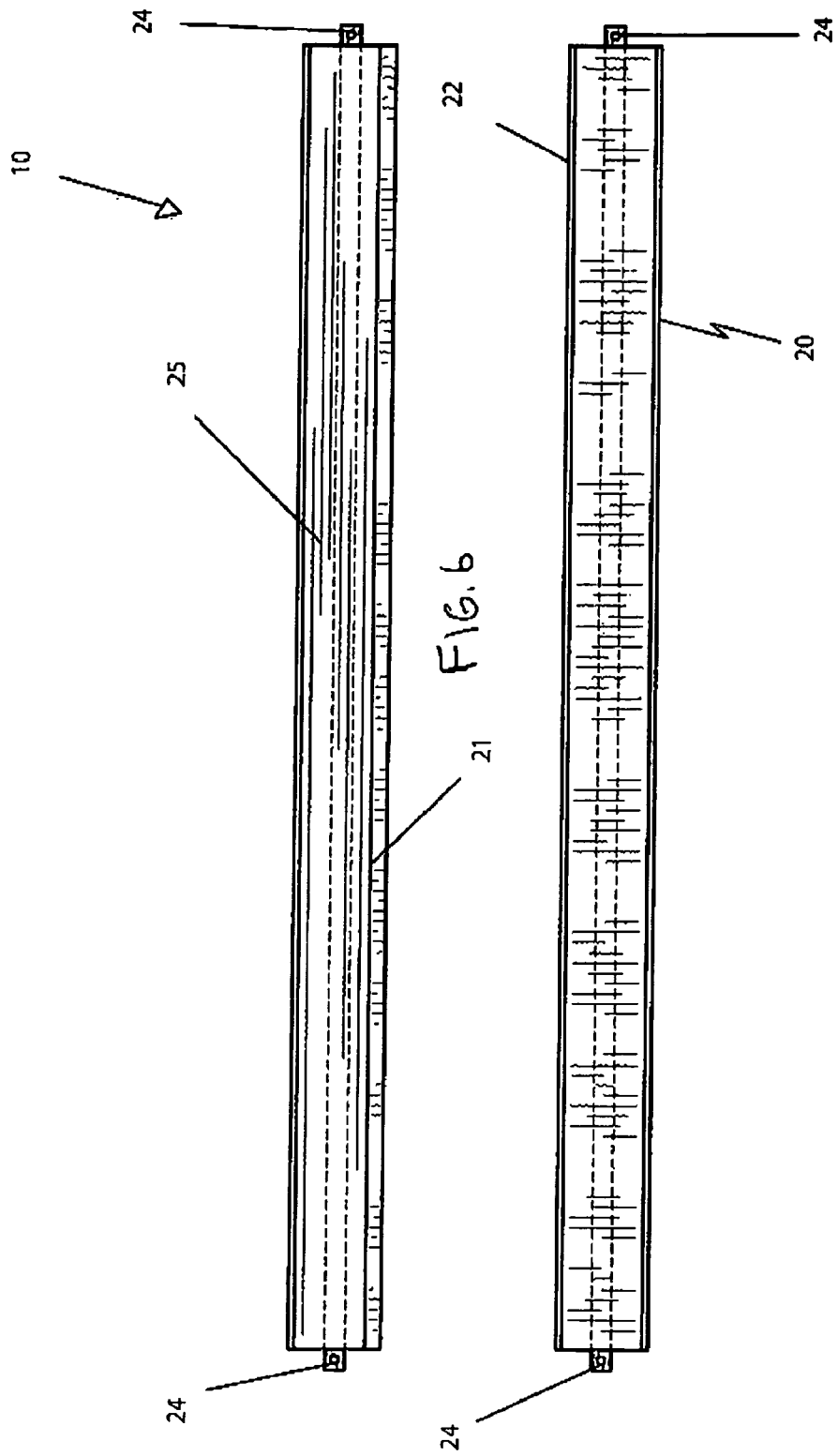
FIG. 6 is a top planar view of a support plate, in accordance with the present invention.
Figure 7:
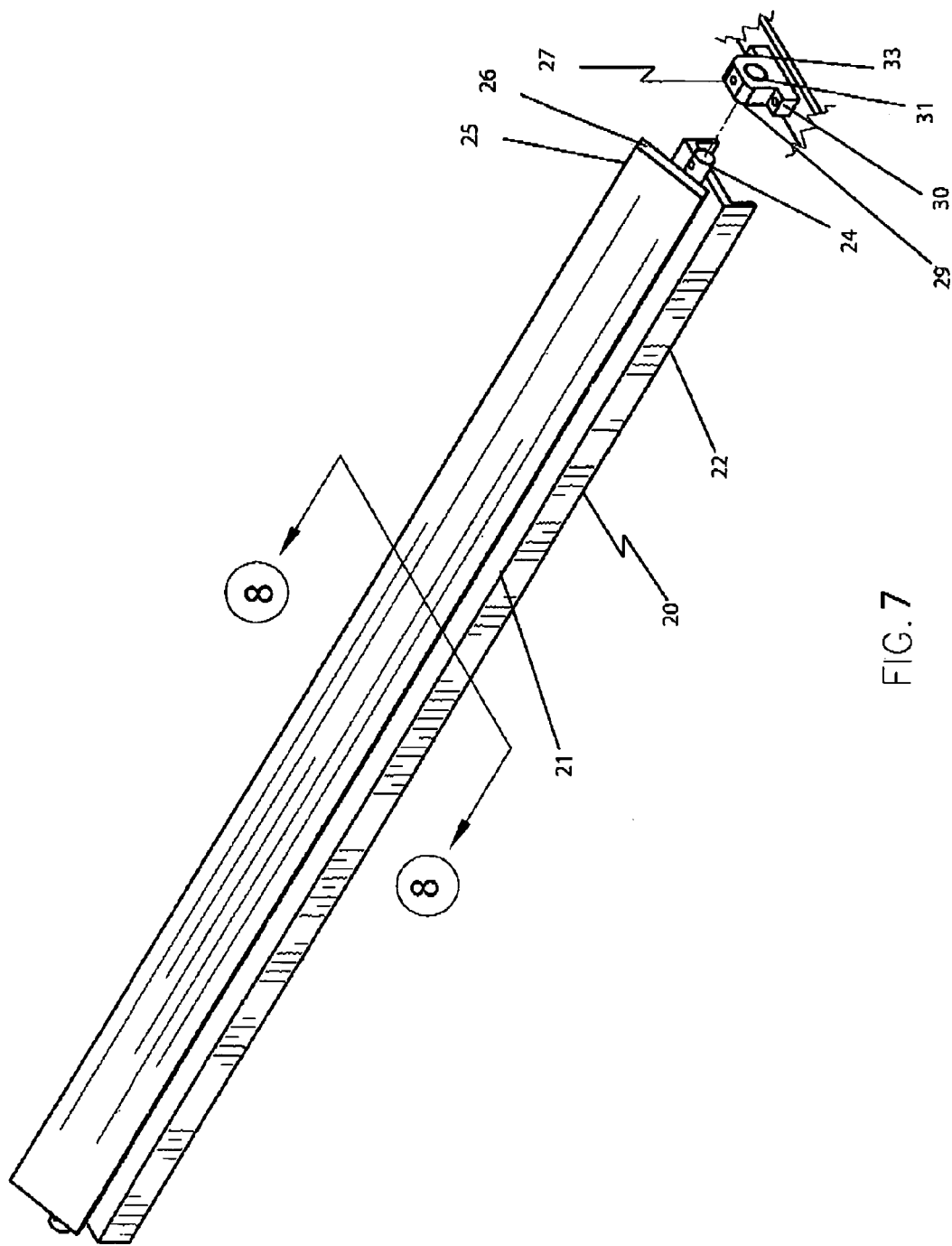
FIG. 7 is a perspective view of a trailer rail assembly, in accordance with the present invention.
Figure 8:
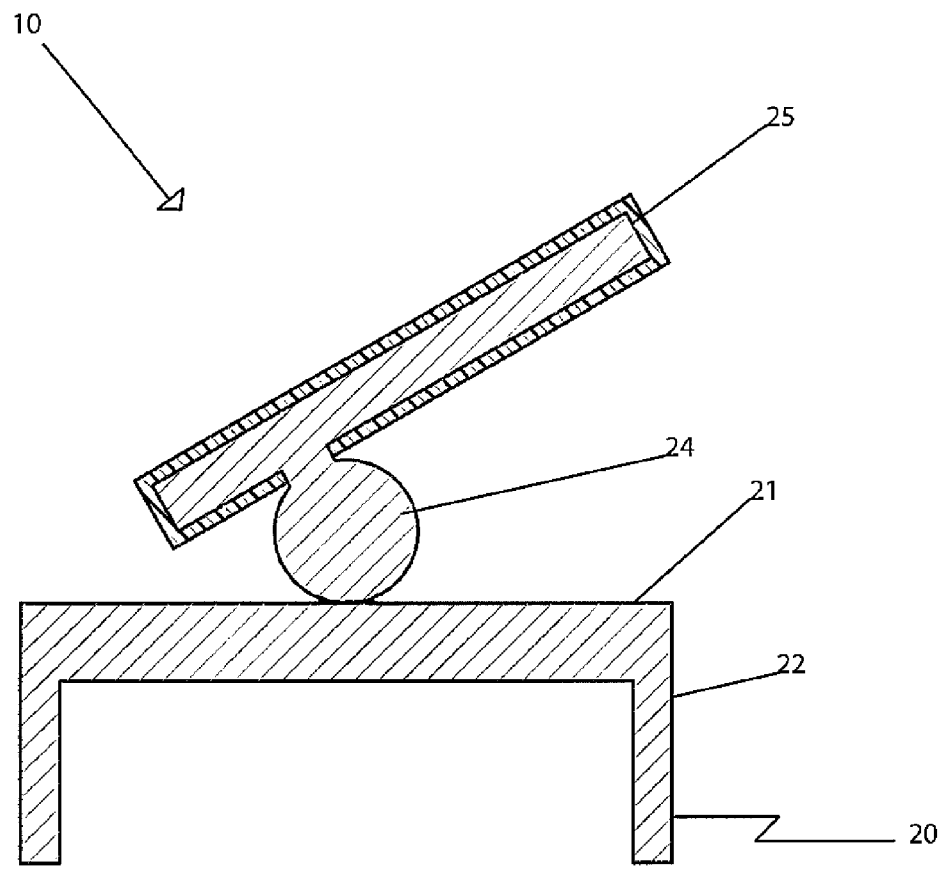
FIG. 8 is a cross sectional view of a trailer rail assembly, in accordance with the present invention.

The apparatus of this invention is referred to generally in FIGS. 1-9 by the reference numeral 10 and is intended to protect a trailer rail assembly. It should be understood that the apparatus 10 may be used to protect many different types of trailers and should not be limited in use with only those types of trailers mentioned herein.

Referring initially to FIGS. 1-6, a trailer rail assembly 10 includes a base plank 20 with a planar top surface 21 raised above a horizontal plane 22 and extending along an entire longitudinal length of the base member 23. Such a base plank 20 has a U-shaped cross-section. The assembly 10 further includes a cylindrical shaft 24 with an annular cross-section spanning along an entire longitudinal length of the top surface 21. Such a shaft 24 has a rectilinear shape and is directly coupled, without the use of intervening elements, to the base plank 20 and the support plate 25 respectively.

Referring to FIGS. 3-6, the assembly 10 further includes a support plate 25 statically and fixedly attached to the shaft 24 and spanning along the entire longitudinal length of the base plank 20. Such a support plate 25 has planar anterior 26 and posterior faces 27. The shaft 24 is intercalated between the base plank 20 and the support plate 25 respectively, and the support plate 25 is pivotal along an arcuate path defined above the base plank 20 which is important such that the support plate 25 is offset at a 45 degree angle with respect to the horizontal plane.

Referring to FIGS. 1 and 2, the assembly 10 further includes a mechanism 26 for simultaneously rotating the shaft 24 and the support plate 25 in sync and about a fulcrum axis extending along an entire longitudinal length of the shaft 24 while the base plank 20 remains statically affixed at a stationary position. Such a simultaneous rotating mechanism 26 includes at least one bracket 27 statically mounted to a portion of the vehicle trailer 28 adjoining an end of the base plank 20. Such a bracket 27 has a raised central portion 29 monolithically formed with a pair of oppositely seated lowered flange portions 30, and the central portion 29 has an orifice 31 formed therein and passing from an anterior surface 32 to a posterior surface 33 of the bracket 27 at a height above the flange portions 30.

Referring again to FIGS. 1 and 2, the simultaneous rotating mechanism further includes a zerk fitting 34 traversing through a side of the central portion 29 and extending along an entire inner perimeter of the orifice 31. A grease lubricant is inserted into the zerk fitting 34, and a fastener 35 is connected to an entrance port 36 of the zerk fitting 34 which is vital such that the zerk fitting 34 is maintained at a stable and static position. An end 39 of the shaft 24 is rotatably interfitted within the orifice 31 and arranged in such a manner that an outer circumference of the end 39 of the shaft 24 directly rubs against the zerk fitting 34 and the lubricant to minimize a frictional force during operating conditions.

The simultaneous rotating mechanism 26 further includes a plurality of auxiliary fastening members 37 penetrated through the flange portions 30 and into the vehicle trailer 28 respectively. A primary fastening member 38 is downwardly penetrated from a top surface of the central portion 29 through the orifice 31 which is crucial such that the primary fastening member 38 locks the shaft 24 at a static position while seated within the orifice 31. The shaft 24 is freely rotatable within the orifice 31 when the primary fastening member 38 is removed from the orifice 31 and detached from the shaft 24 respectively.

The assembly 10 includes a hitch receiver that is effectively mounted on a towing vehicle and a towing bar assembly that conveniently adapts to the trailers on which the towed vehicle is mounted. Such a hitch receiver and tow bar assembly is produced from sturdy, rust resistant materials. Of course, the assembly 10 may be produced from a variety of other suitable materials, as is obvious to a person of ordinary skill in the art.

The assembly 10 further includes a hitch receiver that is eight inches in width, five inches in height and three inches in depth and is effectively and securely mounted on the rear of the towing vehicle. Such an assembly 10 conveniently includes mounting bolts and nuts which are essential for installing the receiving hitch. The receiving hitch has a semi-circular body that extends upward from the base of the unit and advantageously affords a circular opening, which is vital for accommodating the towing bar assembly. Such an opening has interior walls that are conveniently fitted with a circular ball bearing assembly which advantageously allows the towing bar to freely rotate when it is inserted into the opening.

The assembly 10 also includes independent towing bar assemblies each including a circular hub assembly with one bar conveniently attached to opposite sides thereof. Such a hub assembly includes a solid, circular bar that is effectively fitted into the heavy duty, ball bearing assembly that is advantageously installed in a swivel mounted base that can be revolved to the left or right, respectively. Each of the bars attached to opposite sides of the swivel mounted hub assembly have a length of six inches and a diameter of two inches. A metal rail is directly attached, without the use of intervening elements, to the outer end of one bar and a foam lined pad, mounted on a solid base that is at a 45 degree angle, which is directly attached, without the use of intervening elements, to the outer end of the second bar. This feature advantageously allows the user to convert the trailer into a Jet Ski trailer or motorcycle trailer at the same time.

The present invention, as claimed, provides the unexpected and unpredictable benefit of an assembly 10 that is convenient and easy to use, is durable yet lightweight in design, and enables users to tow two different vehicles at the same time. Such an assembly 10 is produced from sturdy materials that advantageously allow the assembly 10 to be used in conjunction with a variety of towed vehicles. The assembly 10 conveniently removes the need for users to have two different towing vehicles when towing two vehicles at the same time. The simultaneous towing feature of the present invention advantageously saves the user a considerable amount of time and energy when compared to conventional methods of towing.

In use, a method for supporting objects on a vehicle trailer includes the steps of: providing a base plank 20 with a planar top surface 21 raised above a horizontal plane and extending along an entire longitudinal length of the base member 23; providing a cylindrical shaft 24 with an annular cross-section by spanning the shaft 24 along an entire longitudinal length of the top surface 21; statically and fixedly attaching a support plate 25 to the shaft 24 by spanning the support plate 25 along the entire longitudinal length of the base plank 20; positioning the object against the support plate 25; and simultaneously rotating the shaft 24 and the support plate 25 in sync and about a fulcrum axis extending along an entire longitudinal length of the shaft 24 while the base plank 20 remains statically affixed at a stationary position.

In use, the method further includes the steps of: statically mounting at least one bracket 27 to a portion of the vehicle trailer adjoining an end of the base plank 20. Such a bracket 27 has a raised central portion 29 monolithically formed with a pair of oppositely seated lowered flange portions 30, and the central portion 29 has an orifice 31 formed therein and passing from an anterior surface 32 to a posterior surface 33 of the bracket 27 at a height above the flange portions 30. The steps further include: traversing a zerk fitting 34 through a side of the central portion 29 by extending the zerk fitting 34 along an entire inner perimeter of the orifice 31; inserting a grease lubricant into the zerk fitting 34; connecting a fastener 35 to an entrance port 36 of the zerk fitting 34 such that the zerk fitting 34 is maintained at a stable and static position; and rotatably interfitting an end of the shaft 24 within the orifice 31 by directly rubbing an outer circumference of the end of the shaft 24 against the zerk fitting 34 and the lubricant to minimize a frictional force during operating conditions.

In use, the method further includes the steps of: penetrating a plurality of auxiliary fastening members 37 through the flange portions 30 and into the vehicle trailer respectively; downwardly penetrating a primary fastening member 38 from a top surface of the central portion 29 through the orifice 31; the primary fastening member 38 locking the shaft 24 at a static position while seated within the orifice 31; and freely rotating the shaft 24 within the orifice 31 when the primary fastening member 38 is removed from the orifice 31 and detached from the shaft 24 respectively.

In use, the method further includes the steps of: directly coupling the shaft 24 to the base plank 20 and the support plate 25 respectively; intercalating the shaft 24 between the base plank 20 and the support plate 25 respectively; and pivoting the support plate 25 along an arcuate path defined above the base plank 20 such that the support plate 25 is offset at a 45 degree angle with respect to the horizontal plane.

While the invention has been described with respect to a certain specific embodiment, it will be appreciated that many modifications and changes may be made by those skilled in the art without departing from the spirit of the invention.

It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A trailer rail assembly for supporting objects on a vehicle trailer, said trailer rail assembly comprising:
   a base plank having a planar top surface raised above a horizontal plane and extending along an entire longitudinal length of said base plank;
   a shaft having an annular cross-section and spanning along an entire longitudinal length of said top surface; and
   a support plate statically and fixedly attached to said shaft and spanning along the entire longitudinal length of said base plank; and
   means for simultaneously rotating said shaft and said support plate in sync and about a fulcrum axis extending along an entire longitudinal length of said shaft while said base plank remains statically affixed at a stationary position;
   wherein said simultaneous rotating means comprises
   at least one bracket statically mounted to a portion of the vehicle trailer adjoining an end of said base plank, said bracket having a raised central portion monolithically formed with a pair of oppositely seated lowered flange portions, said central portion having an orifice formed therein and passing from an anterior surface to a posterior surface of said bracket at a height above said flange portions;
   a zerk fitting traversing through a side of said central portion and extending along an entire inner perimeter of said orifice;
   a lubricant inserted into said zerk fitting; and
   a fastener connected to an entrance port of said zerk fitting such that said zerk fitting is maintained at a stable and static position;
   wherein an end of said shaft is rotatably interfitted within said orifice and arranged in such a manner that an outer circumference of said end of said shaft directly rubs against said zerk fitting and said lubricant to minimize a frictional force during operating conditions.

2. The trailer rail assembly of claim 1, wherein said simultaneous rotating means further comprises:
   a plurality of auxiliary fastening members being penetrated through said flange portions and into the vehicle trailer respectively; and
   a primary fastening member being downwardly penetrated from a top surface of said central portion thru said orifice such that said primary fastening member locks said shaft at a static position while seated within said orifice;
   wherein said shaft is freely rotatable within said orifice when said primary fastening member is removed from said orifice and detached from said shaft respectively.

3. The trailer rail assembly of claim 1, wherein said shaft is intercalated between said base plank and said support plate respectively.

4. The trailer rail assembly of claim 1, wherein said support plate is pivotal along an arcuate path defined above said base plank such that said support plate is offset at a 45 degree angle with respect to the horizontal plane.

5. A trailer rail assembly for supporting objects on a vehicle trailer, said trailer rail assembly comprising:
   a base plank having a planar top surface raised above a horizontal plane and extending along an entire longitudinal length of said base plank, said base plank having a U-shaped cross-section;
   a cylindrical shaft having an annular cross-section and spanning along an entire longitudinal length of said top surface; and
   a support plate statically and fixedly attached to said shaft and spanning along the entire longitudinal length of said base plank, said support plate having planar anterior and posterior faces; and
   means for simultaneously rotating said shaft and said support plate in sync and about a fulcrum axis extending along an entire longitudinal length of said shaft while said base plank remains statically affixed at a stationary position;
   wherein said simultaneous rotating means comprises
   at least one bracket statically mounted to a portion of the vehicle trailer adjoining an end of said base plank, said bracket having a raised central portion monolithically formed with a pair of oppositely seated lowered flange portions, said central portion having an orifice formed therein and passing from an anterior surface to a posterior surface of said bracket at a height above said flange portions;
   a zerk fitting traversing through a side of said central portion and extending along an entire inner perimeter of said orifice;
   a grease lubricant inserted into said zerk fitting; and
   a fastener connected to an entrance port of said zerk fitting such that said zerk fitting is maintained at a stable and static position;
   wherein an end of said shaft is rotatably interfitted within said orifice and arranged in such a manner that an outer circumference of said end of said shaft directly rubs against said zerk fitting and said lubricant to minimize a frictional force during operating conditions.

6. The trailer rail assembly of claim 5, wherein said simultaneous rotating means further comprises:
   a plurality of auxiliary fastening members being penetrated through said flange portions and into the vehicle trailer respectively; and a primary fastening member being downwardly penetrated from a top surface of said central portion thru said orifice such that said primary fastening member locks said shaft at a static position while seated within said orifice;

wherein said shaft is freely rotatable within said orifice when said primary fastening member is removed from said orifice and detached from said shaft respectively.

7. The trailer rail assembly of claim 5, wherein said shaft is intercalated between said base plank and said support plate respectively.

8. The trailer rail assembly of claim 5, wherein said support plate is pivotal along an arcuate path defined above said base plank such that said support plate is offset at a 45 degree angle with respect to the horizontal plane.

9. A method for supporting objects on a vehicle trailer, said method comprising the steps of:
   a. providing a base plank having a planar top surface raised above a horizontal plane and extending along an entire longitudinal length of said base plank;
   b. providing a cylindrical shaft having an annular cross-section by spanning said shaft along an entire longitudinal length of said top surface;
   c. statically and fixedly attaching a support plate to said shaft by spanning said support plate along the entire longitudinal length of said base plank;
   d. positioning the object against said support plate; and
   e. simultaneously rotating said shaft and said support plate in sync and about a fulcrum axis extending along an entire longitudinal length of said shaft while said base plank remains statically affixed at a stationary position;
   wherein step e. comprises
      statically mounting at least one bracket to a portion of the vehicle trailer adjoining an end of said base plank, said bracket having a raised central portion monolithically formed with a pair of oppositely seated lowered flange portions, said central portion having an orifice formed therein and passing from an anterior surface to a posterior surface of said bracket at a height above said flange portions;
      traversing a zerk fitting through a side of said central portion by extending said zerk fitting along an entire inner perimeter of said orifice;
      inserting a grease lubricant into said zerk fitting;
      connecting a fastener to an entrance port of said zerk fitting such that said zerk fitting is maintained at a stable and static position; and
      rotatably interfitting an end of said shaft within said orifice by directly rubbing an outer circumference of said end of said shaft against said zerk fitting and said lubricant to minimize a frictional force during operating conditions.

10. The method of claim 9, wherein step e. further comprises the steps of:
   penetrating a plurality of auxiliary fastening members through said flange portions and into the vehicle trailer respectively;
   downwardly penetrating a primary fastening member from a top surface of said central portion thru said orifice;
   said primary fastening member locking said shaft at a static position while seated within said orifice; and
   freely rotating said shaft within said orifice when said primary fastening member is removed from said orifice and detached from said shaft respectively.

11. The method of claim 9, wherein step c. further comprises the step of: intercalating said shaft between said base plank and said support plate respectively.

12. The method of claim 9, wherein step e. further comprises the step of: pivoting said support plate along an arcuate path defined above said base plank such that said support plate is offset at a 45 degree angle with respect to the horizontal plane.

* * * * *